(12) United States Patent
Yeo et al.

(10) Patent No.: US 7,706,029 B2
(45) Date of Patent: Apr. 27, 2010

(54) DISPLAY APPARATUS USING OPTICAL MODULATOR AND DISPLAY METHOD THEREOF

(75) Inventors: In-Jae Yeo, Yongin-si (KR); Kyu-Bum Han, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 880 days.

(21) Appl. No.: 11/540,132

(22) Filed: Sep. 29, 2006

(65) Prior Publication Data

US 2007/0076092 A1 Apr. 5, 2007

(30) Foreign Application Priority Data

Sep. 29, 2005 (KR) .................. 10-2005-0091382
Sep. 7, 2006 (KR) .................. 10-2006-0086431

(51) Int. Cl.
*H04N 1/04* (2006.01)
*G06F 3/038* (2006.01)

(52) U.S. Cl. .................. 358/480; 358/482; 358/345; 345/204

(58) Field of Classification Search .................. 355/49, 355/57; 399/64, 118; 358/474, 475, 509, 358/510, 511, 514, 480, 481, 482, 484, 496, 358/497, 498; 345/156, 204, 10; 348/14.01
See application file for complete search history.

(56) References Cited

U.S. PATENT DOCUMENTS

| 5,311,360 | A | | 5/1994 | Bloom et al. | |
| 5,373,154 | A | * | 12/1994 | Chen | 250/235 |
| 6,870,559 | B2 | * | 3/2005 | Kanno | 347/250 |
| 7,202,467 | B2 | * | 4/2007 | Koehler et al. | 250/221 |
| 2006/0023231 | A1 | * | 2/2006 | Ohmiya | 358/1.7 |
| 2008/0055340 | A1 | * | 3/2008 | Yeo et al. | 345/690 |

FOREIGN PATENT DOCUMENTS

| JP | 2002-006246 A | | 1/2002 |
| JP | 02006118954 | * | 5/2009 |
| KR | 1998-0067811 A | | 10/1998 |

* cited by examiner

*Primary Examiner*—Jerome Grant, II
(74) *Attorney, Agent, or Firm*—Christensen O'Connor Johnson Kindness PLLC

(57) ABSTRACT

A mobile display apparatus using an optical modulator is disclosed, comprising: a sensor sensing a light reflected from a side of a scanning device and then generating a scanning device reference signal specifying a position of the scanning device; and a driving signal control unit generating such scanning device control signal and optical modulator control signal that allow a light emitted from an optical modulator to be reflected in a predetermined area of the scanning device, by synchronizing the scanning device reference signal transferred from the sensor with an image synchronization signal.

18 Claims, 13 Drawing Sheets

DISPLAY APPARATUS USING OPTICAL MODULATOR AND DISPLAY METHOD THEREOF

BACKGROUND

1. Technical Field

The present invention relates to a display apparatus and a display method thereof, in particular, to a mobile display apparatus using an optical modulator and a display method thereof.

2. Description of the Related Art

An optical signal processing has advantages such as fastness, a capability for parallel processing, and a capability of processing a large volume of information, compared to an existing digital information processing which cannot deal with large volume of data and cannot perform a real time processing. Besides, there have been studies on a design of a binary phase filter, an optical logic gate, an optical amplifier, an optical element, and an optical modulator. using space optical modulation theory. Among them, the optical modulator is applied to an optical memory, an optical display device, a printer, an optical interconnection, and a hologram, and a light beam scanning device using the optical modulator is under development.

Such a light beam scanning device in a laser printer, an LED printer, an electric photo copier, a word processor and a projector, scans a light beam and spots a photosensitive medium with the light beam, thereby generating an image.

As a projection TV has been introduced, the light beam scanning device is also employed as a beam projector.

FIG. 1A is a schematic view of a display device using an optical modulator and a polygon mirror according to a prior art. In FIG. 1A are illustrated a light source 110, a control part 120, a lens 130, a polygon mirror 140, and a screen 150. Here, an optical modulator is dispensable in a mobile projector, but descriptions below will concentrate on a mobile projector using an optical modulator.

The light source 110 generates a laser beam, which is later reflected and diffracted by the optical modulator. Here, the light source 110 generates the laser beams simultaneously in a vertical direction, and such laser beams create a two-dimensional image by the rotating polygon mirror 140. The light source 110 may be composed of a laser or a laser diode, and the control part 120 controls the light source 110 to turn on/off, whereupon a laser beam is generated.

The control part 120 also controls a driving of the polygon mirror 140.

The lens 130 collects the laser beams emitted from the light source 110 toward a rotation axis of the polygon mirror 140.

The control part 120 controls the polygon mirror 140 to be turned on/off, and the polygon mirror 140 rotates constantly at a predetermined angular speed. Such a polygon mirror 140 has a polygonal shape, each side of which reflects an incident beam.

The polygon mirror 140 has a bidirectionally rotatable motor (not shown in the accompanying drawings), and rotates due to the motor to reflect an incident beam projected through the lens 130 toward the screen 150.

The configuration of such a display apparatus will be set forth in detail with FIG. 1B. FIG. 1B is a block diagram of a mobile display apparatus control part according to a prior art. Referring to FIG. 1B, R, G, and B image signals are inputted from a mobile display apparatus 160 to a mobile display apparatus control part 170. Here, an image signal input part 173 transfers image signals, comprising R, G, and B digital data and timing signals, transferred from the mobile display apparatus 160 to an image correcting part 171. Then, the image correcting part 171 corrects the image signals according to a deviation between elements or color characteristics of the image signals. Here, the image correcting part 171 is connected to an external memory 180, and reads an initial set value therefrom to perform a correcting process using correction logic.

An image data synchronization signal output part 175 makes an image signal pivot from a raster scan direction to a vertical direction, and transfers synchronization signals per frame, pixel synchronization signals, and vertical line output timing signals to a panel driver 183.

The panel driver 183 converts digital image data to analog signals, and drives an optical modulator panel 186 in synchronization with the vertical line output timing signal. Also, the panel driver 183 matches an image gradient to an output voltage level by referring to an analog voltage range decided in an upper electrode voltage range regulating part 172.

The optical modulator panel 186 is mechanically deformed by a voltage difference between an upper electrode and a lower electrode (a voltage is applied by a lower electrode voltage control part 174), and modulates the amount of diffraction of a light emitted from a light source 192.

A scanner output control part 176 outputs a position control signal of a scanning device 196 to a scanner driver 194, in synchronization with the vertical line output timing signal. A light source output control unit 177 generates and then transfers a light source control signal to a light source driver 190 driving a light source 192, so that R, G and B light sources sequentially operate in synchronization with the image synchronization signal. A memory 180 stores therein correction values (classified by pixel and color) with respect to the image correcting part 171, a range of upper electrode voltages, an initial set value of a lower electrode voltage, a scanner profile, and a light source output set value.

Here, in the case of using the optical modulator and the polygon mirror 140, the mobile projector needs to synchronize the polygon mirror 140 with the image signals in order to project certain beams onto the screen 150. In other words, in order to reflect a corresponding image to the screen 150 through an effective area of the polygon mirror 140, the image synchronization signal and a rotation of the polygon mirror need to be controlled to project a laser beam corresponding to the image signal to the effective area.

SUMMARY

Accordingly, the present invention provides a display apparatus using an optical modulator and a display method thereof, synchronizing image signals with rotation and position of a scanning device.

Also, the present invention provides a display apparatus using an optical modulator and a display method thereof, controlling a rotation of a scanning device by using a scanning device reference signal generated by an image synchronization signal and a sensor.

One aspect of the present invention provides a mobile display apparatus using an optical modulator, comprising: a sensor sensing a light reflected from a side of a scanning device and then generating a scanning device reference signal specifying a position of the scanning device; and a driving signal control unit generating such scanning device control signal and optical modulator control signal that allow a light emitted from an optical modulator to be reflected in a predetermined area of the scanning device, by synchronizing the scanning device reference signal transferred from the sensor with an image synchronization signal.

Here, the image synchronization signal is delayed for a predetermined time to be synchronized with the scanning device reference signal.

Here, the scanning device is a polygon mirror or a rotating bar.

Furthermore, the mobile display apparatus further comprises a scanning driver controlling a rotation of the scanning device by receiving a scanning device reference signal or a scanning device control signal from a driving signal control unit.

Also, the mobile display apparatus further comprises an optical modulator control unit controlling the optical modulator by receiving the optical modulator control signal from the driving signal control unit.

Another aspect of the present invention provides a mobile display apparatus using an optical modulator, comprising: an image input unit receiving an image signal from a mobile terminal; an image data processing unit converting the format of the image signal to a format adequate to the optical modulator-wherein the image signal comprises an image synchronization signal and image data: a sensor sensing a light reflected from a side of a scanning device and then generating a scanning device reference signal specifying a position of the scanning device; and a driving signal control unit generating such polygon mirror control signal and optical modulator control signal that allow a light emitted from the optical modulator to be reflected in a predetermined area of the polygon mirror, by synchronizing the scanning device reference signal transferred from the sensor with an image synchronization signal converted in the image data processing unit.

Here, the image synchronization signal is delayed for a predetermined time to be synchronized with the scanning device reference signal.

Here, the scanning device is a polygon mirror or a rotating bar.

Also, the mobile display apparatus further comprises a scanning driver controlling a rotation of the scanning device by receiving the scanning device reference signal or the scanning device control signal from the driving signal control unit.

Furthermore, the mobile display apparatus further comprises an optical modulator control unit controlling the optical modulator by receiving the optical modulator control signal from the driving signal control unit.

Another aspect of the present invention provides a display method using an optical modulator comprising: transferring an image signal from a mobile terminal to an image input unit; converting a format of the image signal to a format adequate to an optical modulator, by an image data processing unit; sensing a light reflected from a side of a scanning device and then generating a scanning device reference signal specifying a position of the scanning device, by a sensor: and generating such scanning device control signal and optical modulator control signal that allow a light emitted from the optical modulator to be reflected in a predetermined area of the scanning device, by synchronizing the scanning device reference signal transferred from the sensor with an image synchronization signal converted in the image data processing unit, by a driving signal control unit.

Here, the image synchronization signal is delayed for a predetermined time to be synchronized with the scanning device reference signal.

Also, the display method further comprises controlling a rotation of the scanning device by receiving the scanning device reference signal or the scanning device control signal from the driving signal control unit, by a scanning driver Furthermore, the display method further comprises controlling the optical modulator by receiving the optical modulator control signal from the driving signal control unit, by an optical modulator control unit.

Here, the scanning device is a polygon mirror or a rotating bar.

Additional aspects and advantages of the present general inventive concept will be set forth in part in the description which follows, and in part will be obvious from the description, or may be learned by practice of the general inventive concept.

BRIEF DESCRIPTION OF THE DRAWINGS

These and other features, aspects, and advantages of the present invention will become better understood with regard to the following description, appended claims, and accompanying drawings where:

DETAILED DESCRIPTION

Hereinafter, embodiments of the invention will be described in more detail with reference to the accompanying drawings. In the description with reference to the accompanying drawings, those components are rendered the same reference number that are the same or are in correspondence regardless of the figure number, and redundant explanations are omitted.

Also, an optical modulator applied in the present invention will first be described before discussing embodiments of the present invention.

The optical modulator is mainly divided into a direct type, which directly controls the on/off state of light, and an indirect type, which uses reflection and diffraction. The indirect type may be further divided into an electrostatic type and a piezoelectric type. The optical modulators are applicable to the embodiments of the invention regardless of the operation type.

An electrostatic type grating optical modulator as disclosed in U.S. Pat. No. 5,311,360 includes a plurality of equally spaced deformable reflective ribbons having reflective surfaces and suspended above an upper part of the substrate.

First, an insulation layer is deposited onto a silicon substrate, followed by depositions of a sacrificial silicon dioxide film and a silicon nitride film. The silicon nitride film is patterned with the ribbons, and some portions of the silicon dioxide film are etched so that the ribbons are maintained by a nitride frame on an oxide spacer layer. The ribbon and the oxide spacer of the optical modulator are designed to have a thickness of $\lambda 0/4$ in order to modulate a light having a single wavelength $\lambda 0$.

The grating amplitude, of such a modulator limited to the vertical distance d between the reflective surfaces of the ribbons and the reflective surface of the substrate, is controlled by supplying a voltage between the ribbons (the reflective surface of the ribbon, which acts as a first electrode) and the substrate (the conductive film at the bottom portion of the substrate, which acts as a second electrode).

Figure 1A:
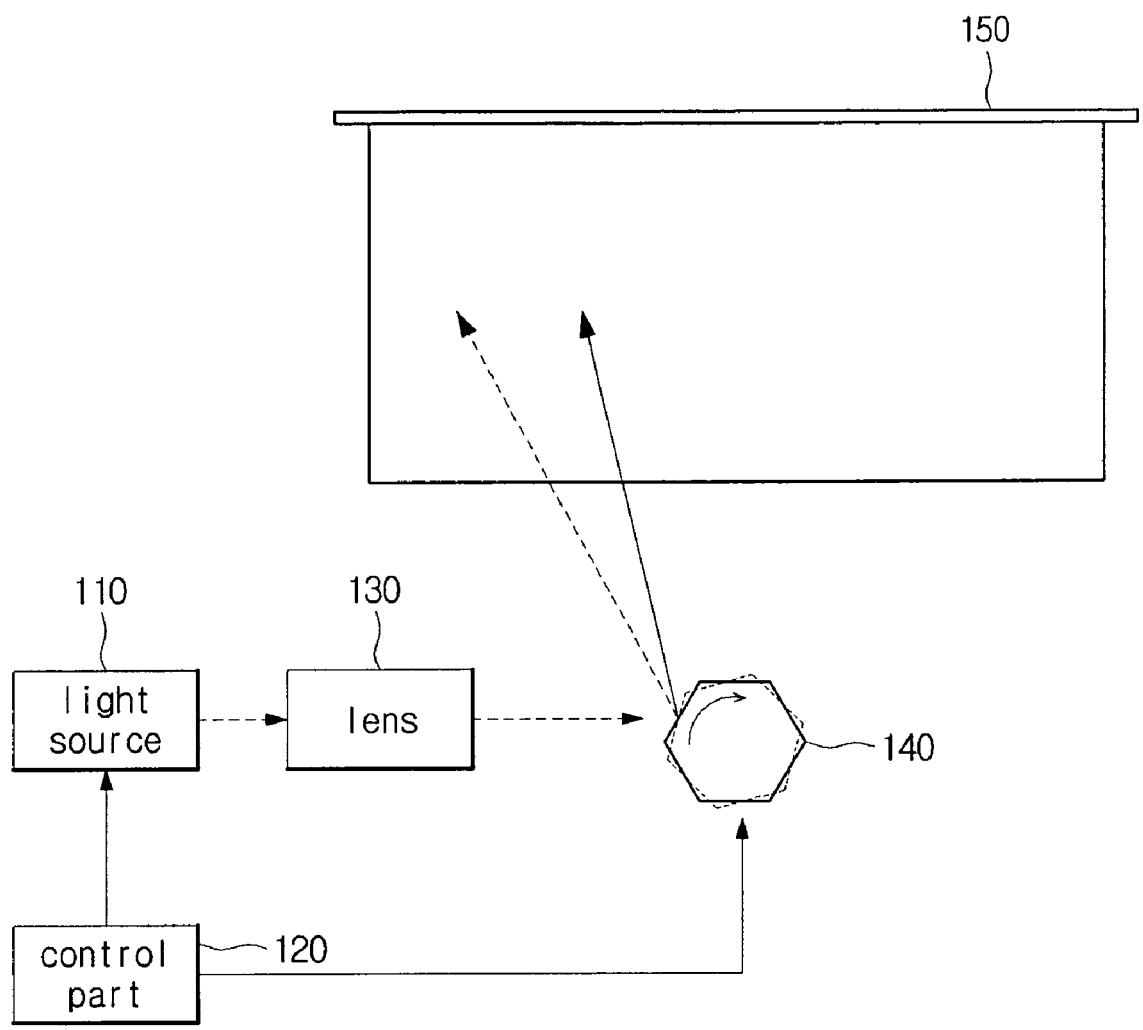
FIG. 1A is a schematic view of a display apparatus using an optical modulator and a polygon mirror according to a prior art.
Figure 1B:
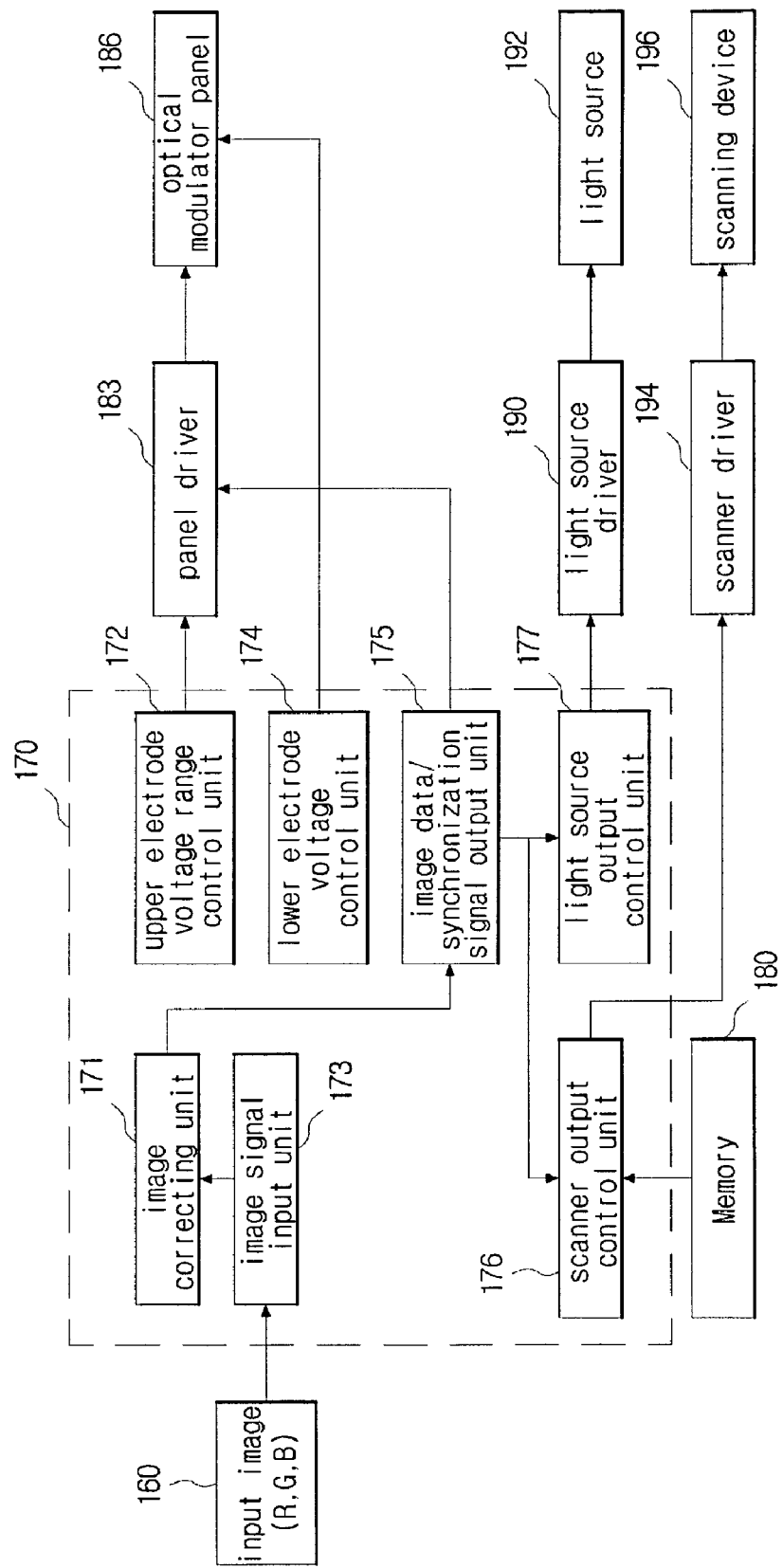
FIG. 1B is a block diagram of a mobile display apparatus control part according to a prior art.
Figure 2A:
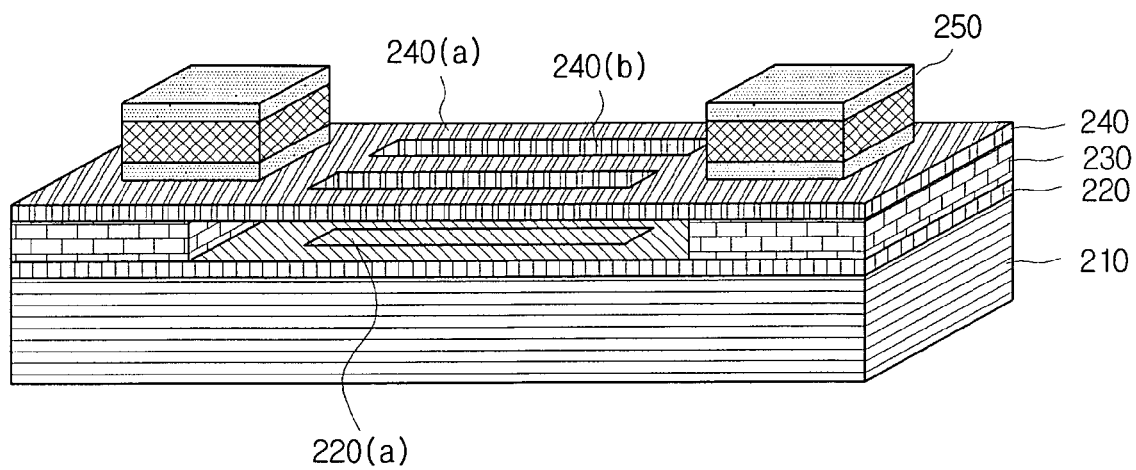
FIG. 2A is a perspective view of a diffraction type optical modulator module using piezoelectric elements applicable to an embodiment of the present invention.
Figure 2B:
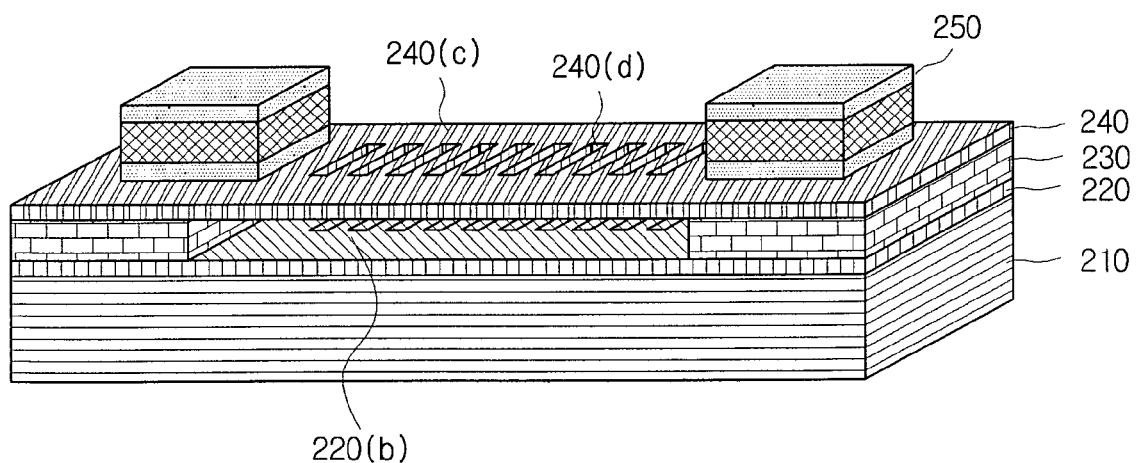
FIG. 2B is a perspective view of another diffraction type optical modulator module using piezoelectric elements applicable to an embodiment of the present invention.

FIG. 2A is a perspective view of a diffraction type optical modulator module using piezoelectric elements, applicable to the present invention, and FIG. 2B is a perspective view of another diffraction type optical modulator module using piezoelectric elements, applicable to an embodiment of the invention. In FIGS. 2A and 2B illustrated optical modulators, each comprising a substrate 210, an insulation layer 220, a sacrificial layer 230, a ribbon structure 240, and piezoelectric elements 250.

The substrate 210 is a commonly used semiconductor substrate, and the insulation layer 220 is deposited as an etch stop layer. The insulation layer 220 is formed from a material with a high selectivity to the etchant (the etchant is an etchant gas or an etchant solution) that etches the material used as the sacrificial layer. Here, reflective layers 220(a) and 220(b) may be formed on the insulation layer 220 to reflect incident beams of light.

The sacrificial layer 230 supports the ribbon structure 240 so that the ribbon structure 240 is displaced by a particular gap from the insulation layer 220, and forms a space in the center part.

The ribbon structure 240 creates diffraction and interference in the incident light to provide optical modulation of signals as described above. The form of the ribbon structure 240 may be composed of a plurality of ribbon shapes according to the electrostatic type, or may comprise a plurality of open holes in the center portion of the ribbons according to the piezoelectric type. The piezoelectric elements 250 control the ribbon structure 240 to move vertically, according to the degree of up/down or left/right contraction and expansion generated by the difference in voltage between the upper and lower electrodes. Here, the reflective layers 220(a), 220(b) are formed in correspondence with the holes 240(b), 240(d) formed in the ribbon structure 240.

For example, in the case where the wavelength of a beam of light is $\lambda$, when there is no power supplied or when there is a predetermined amount of power supplied, the gap between an upper reflective layer 240(a), 240(c) formed on the ribbon structure and the insulation layer 220, on which is formed a lower reflective layer 220(a), 220(b), is equal to $n\lambda/2$ (wherein n is a natural number). Therefore, in the case of a 0th-order diffracted (reflected) beam of light, the overall path length difference between the light reflected by the upper reflective layer 240(a), 240(c) formed on the ribbon structure and the light reflected by the insulation layer 220 is equal to $n\lambda$, so that constructive interference occurs and the diffracted light is rendered its maximum luminosity. In the case of +1st or −1st order diffracted light, however, the luminosity of the light is at its minimum value due to a destructive interference.

Also, when an appropriate amount of power is supplied to the piezoelectric elements 250, other than the supplied power mentioned above, the gap between the upper reflective layer 240(a), 240(c) formed on the ribbon structure and the insulation layer 220, on which is formed the lower reflective layer 220(a), 220(b), becomes $(2n+1)\lambda/4$ (wherein n is a natural number). Therefore, in the case of a 0th-order diffracted (reflected) beam of light, the overall path length difference between the light reflected by the upper reflective layer 240(a), 240(c) formed on the ribbon structure and the light reflected by the insulation layer 220 is equal to $(2n+1)\lambda/2$, so that destructive interference occurs, and the diffracted light is rendered its minimum luminosity. In the case of +1st or −1st order diffracted light, however, the luminosity of the light is at its maximum value due to constructive interference. As a result of such interference, the optical modulator can load signals on the beams of light by controlling the quantity of the reflected or diffracted light.

Although the foregoing describes the cases in which the gap between the ribbon structure 240 and the insulation layer 220, on which is formed the lower reflective layer 220(a), 220(b), is $n\lambda/2$ or $(2n+1)\lambda/4$, it is obvious that a variety of embodiments, which operate with a gap controlling the intensity of interference by diffraction and reflection, can be applied to the present invention.

The descriptions below will focus on the type of optical modulator illustrated in FIG. 2A and described above.

Figure 2C:
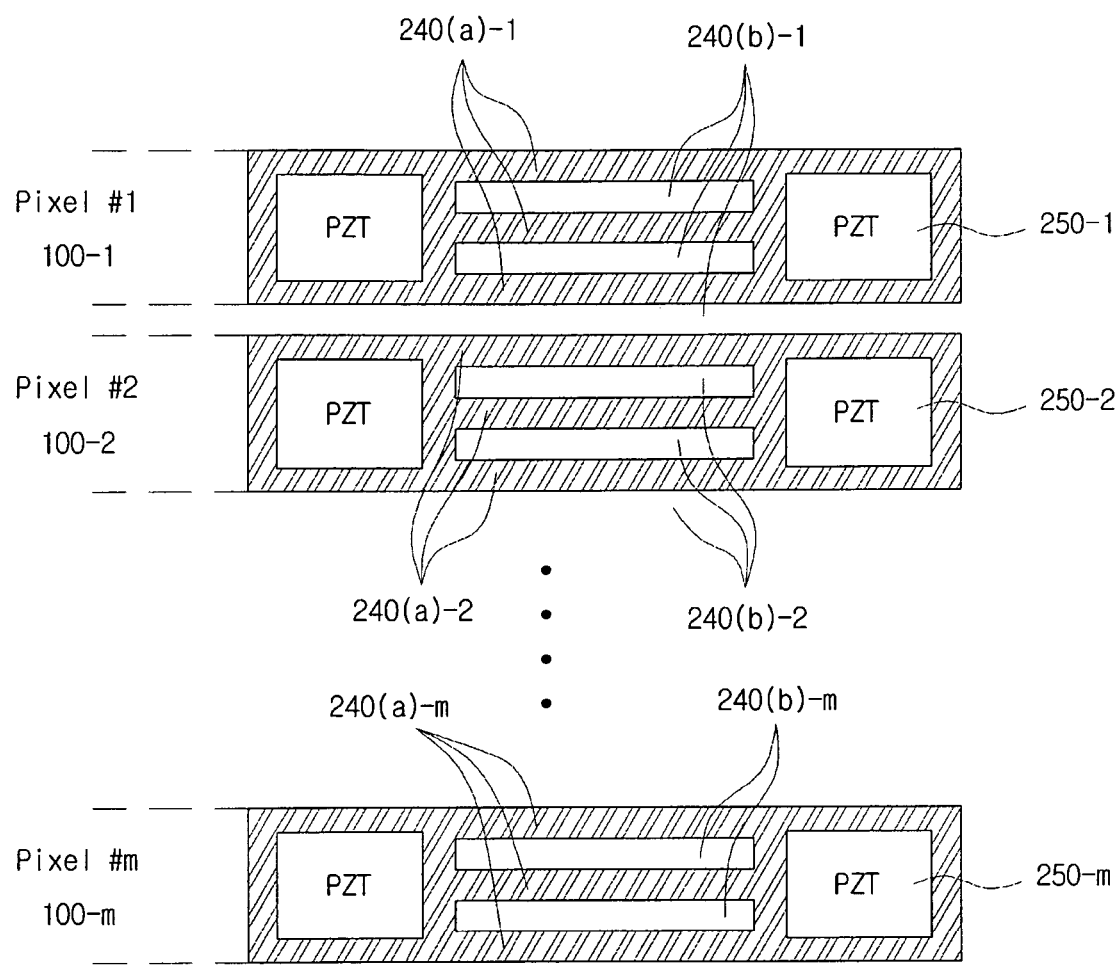
FIG. 2C is a plan view of a diffraction type optical modulator array applicable to an embodiment of the present invention.

Referring to FIG. 2C, the optical modulator is composed of an m number of micromirrors 100-1, 100-2, . . . , 100-m, each responsible for pixel #1, pixel #2, . . . pixel #m. The optical modulator deals with image information with respect to 1-dimensional images of vertical or horizontal scanning lines (here, it is assumed that a vertical or horizontal scanning line consists of an m number of pixels), while each micromirror 100-1, 100-2, . . . , 100-m deals with one pixel among the m pixels constituting the vertical or horizontal scanning line. Thus, the light reflected and diffracted by each micromirror is later projected by an optical scanning device as a 2-dimensional image on a screen. For example, in the case of VGA 640*480 resolution, modulation is performed 640 times on one surface of an optical scanning device (not shown) for 480 vertical pixels, to generate 1 frame of display per surface of the optical scanning device. Here, the optical scanning device may be a polygon mirror, a rotating bar, or a galvano mirror, etc.

While the description below of the principle of optical modulation concentrates on pixel #1, the same can obviously apply to other pixels.

In the present embodiment, it is assumed that the number of holes 240(b)-1 formed in the ribbon structure 240 is two.

Because of the two holes 240(*b*)-1, there are three upper reflective layers 240(*a*)-1 formed on the upper portion of the ribbon structure 240. On the insulation layer 220, two lower reflective layers are formed in correspondence with the two holes 240(*b*)-1. Also, there is another lower reflective layer formed on the insulation layer 220 in correspondence with the gap between pixel #1 and pixel #2. Thus, there are an equal number of upper reflective layers 240(*a*)-1 and lower reflective layers per pixel, and as discussed with reference to FIG. 2A, it is possible to control the luminosity of the modulated light using 0th-order diffracted light or ±1st-order diffracted light.

Figure 2D:
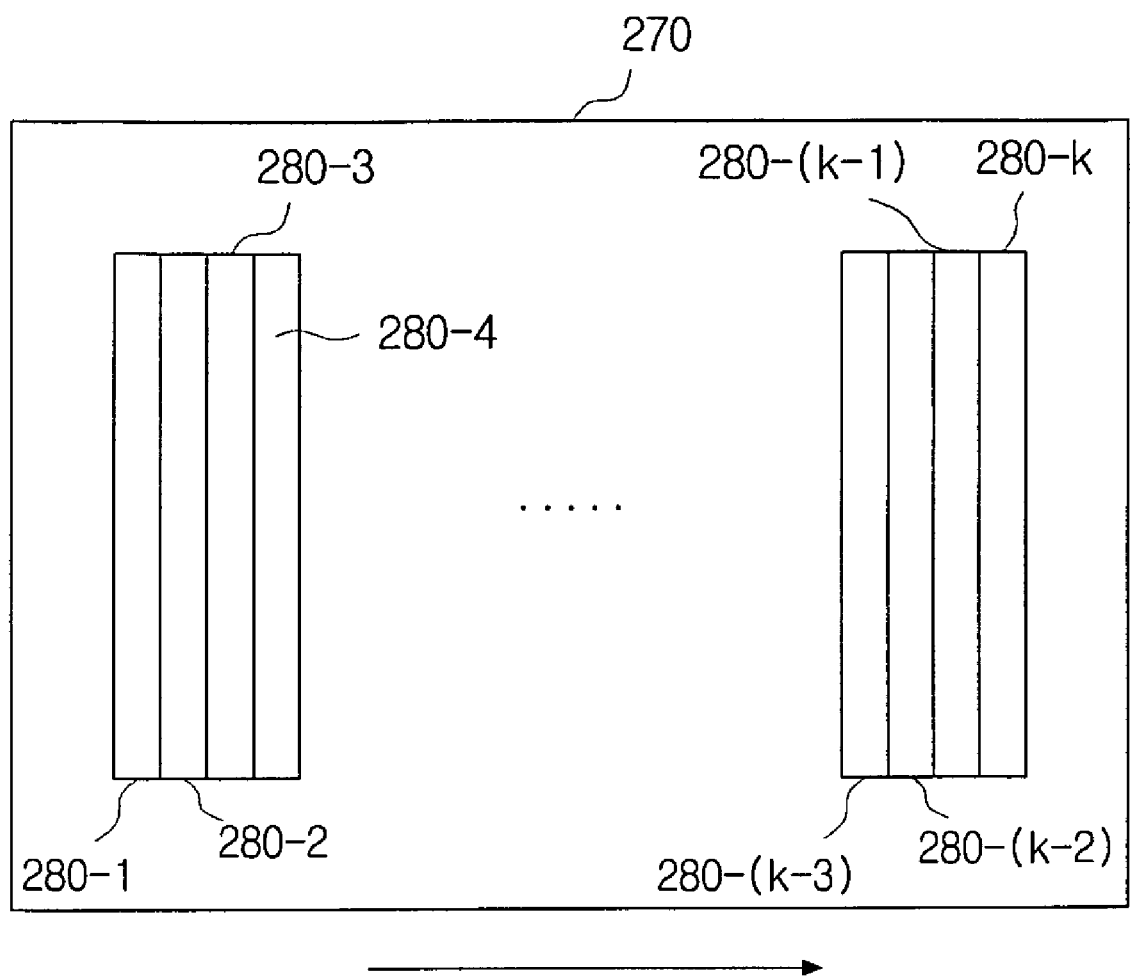
FIG. 2D is a schematic diagram illustrating an image generated on a screen by means of a diffraction type optical modulator array applicable to an embodiment of the invention.

FIG. 2D is a schematic diagram illustrating an image generated on a screen by employing a diffraction type optical modulator array applicable to an embodiment of the invention.

Lights reflected and diffracted by a k number of vertically arranged micromirrors 100-1, 100-2, . . . , 100-*k* are reflected by the optical scanning device and then scanned horizontally onto a screen 270, whereby a picture 280-1, 280-2, 280-3, 280-4, . . . , 280-(*k*-3), 280-(*k*-2), 280-(*k*-1), 280-*k* is generated. One image frame may be projected with one rotation of the optical scanning device. Here, although the scanning is performed from left to right (the arrow indicating direction), it is apparent that images can be scanned in other directions (e.g. in the opposite direction).

Figure 3:
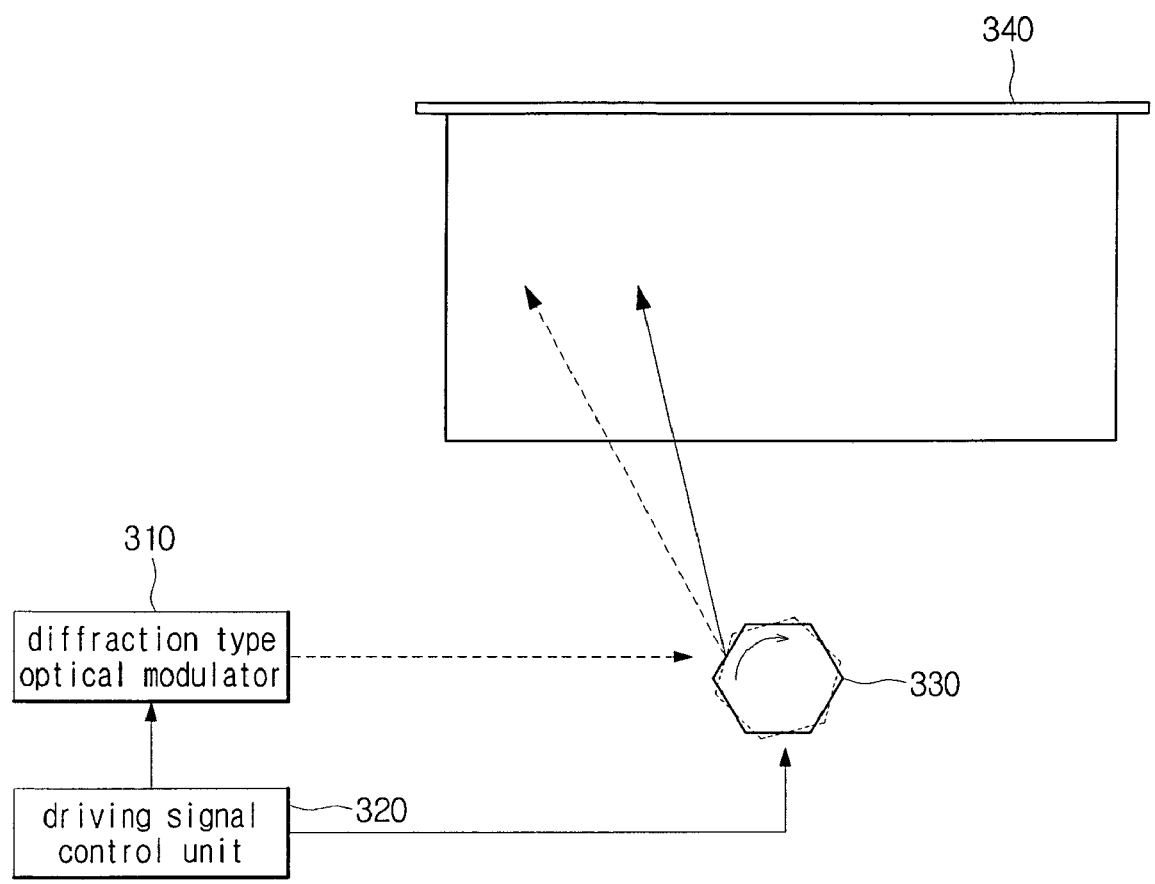
FIG. 3 is a schematic view of a mobile display apparatus using an optical modulator and a polygon mirror according to an embodiment of the present invention.

FIG. 3 is a schematic view of a mobile display apparatus using an optical modulator and a polygon mirror according to an embodiment of the present invention. The descriptions below will focus on a diffraction type optical modulator using piezoelectric elements. In FIG. 3 are illustrated a diffraction type optical modulator 310, a driving signal control unit 320, a polygon mirror 330, and a screen 340.

The diffraction type optical modulator 310 reflects and diffracts a laser beam in correspondence with an image signal. Here, the diffraction type optical modulator 310 generates laser beams in a vertical direction simultaneously, and such laser beams generate a two-dimensional image by using the rotating polygon mirror 330. The number of ribbons of the diffraction type optical modulator 310 is decided based on the number of pixels. For example, in the case of a resolution of VGA 640*480, 480 ribbons are arranged to project laser beams with respect to vertical pixels onto the screen 340 by means of reflection and diffraction.

The driving signal control unit 320 controls a drive of the diffraction type optical modulator 310 and the polygon mirror 330 by receiving a timing value regarding a beam projection inputted from a sensor (not shown in the accompanying drawings). Also, the driving signal control unit 320 generates such polygon mirror control signal and optical modulator control signal that allow a light emitted from the diffraction type optical modulator 310 to be reflected in a predetermined area of the polygon mirror 330, by synchronizing an image synchronization signal with a polygon mirror reference signal transferred from the sensor. Here, the polygon mirror control signal refers to a signal according to which a scanning driver (not shown in the accompanying drawings) can control the polygon mirror. Such a signal may be generated separately or may be substituted by the polygon mirror reference signal.

A lens (not shown in the accompanying drawings) collects laser beams generated from the diffraction type optical modulator 310 toward a rotation axis of the polygon mirror 330.

The image synchronization signal initiates a new frame and a new projection line therewithin. Vertical and horizontal synchronization signals control the new frame and the new projection line to be started, respectively. Since the diffraction type optical modulator 310 has the ribbons formed in a vertical direction, the synchronization needs to occur in the horizontal direction.

The polygon mirror 330 is controlled to be turned on/off by the driving signal control unit 320, and rotates at a preset angular speed whiled turned on. The polygon mirror 330 has a polygonal shape, each side of which reflects an incident light. At this time, the light beam reflected from each side of the polygon mirror 330 is projected to the screen 340, forming a regularly spaced spot arrangement generating a picture on the screen 340. For example, in the case of a resolution of VGA 640*480, the modulation is performed 640 times for 480 vertical pixels at one side of the polygon mirror 330 to generate one frame per side of the polygon mirror 330.

The polygon mirror 330 has a motor (not shown in the accompanying drawings) capable of rotating bidirectionally, and reflects a projected beam through the lens 130 toward the screen 340 while rotating. Here, the polygon mirror 330 may be substituted by a rotating bar or a galvano mirror.

In this case, the polygon mirror reference signal and the polygon mirror control signal may be referred to as a scanning device reference signal and a scanning device control signal, respectively. The following descriptions will focus on a case in which a polygon mirror is employed.

Figure 4A:
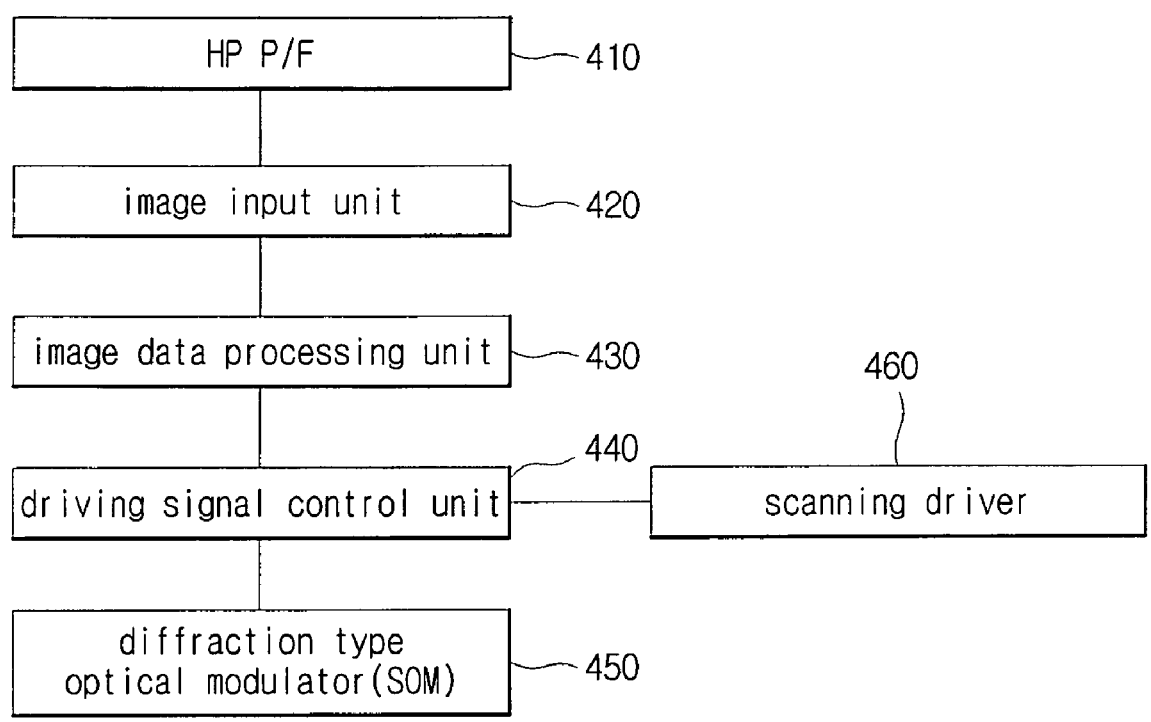
FIG. 4A is a functional block diagram of a mobile display apparatus control part synchronizing an image signal with a polygon mirror according to an embodiment of the present invention.

FIG. 4A is a functional diagram of a mobile display apparatus control part synchronizing an image signal with a polygon mirror according to an embodiment of the present invention. In FIG. 4A are illustrated a mobile terminal platform 410, an image input unit 420, an image data processing unit 430, a driving signal control unit 440, a diffraction type optical modulator 450 and a scanning driver 460.

The mobile terminal platform 410 is a platform mounted in a mobile device such as a pocket PC, a cellular phone, a smart phone and the like. Image signals generated by a user's setting or by default are transferred to the image input unit 420 by the mobile terminal platform 410, and then are transferred to the image data processing unit 430 by the image input unit 420. Here, the image signal comprises an image synchronization signal and image data.

The image data processing unit 430 converts the format of the inputted image signal to a format adequate to the optical modulator.

The driving signal control unit 440 controls the polygon mirror and the optical modulator by synchronizing a polygon mirror reference signal transferred from a sensor (not shown in the accompanying drawings) with an image synchronization signal converted by the image data processing unit, so that a light emitted from the optical modulator can be reflected in a predetermined area of the polygon mirror. The driving signal control unit 440 may generate a separate polygon mirror control signal and an optical modulator control signal. Here, the sensor senses a light reflected from a side of the polygon mirror, and generates a polygon mirror reference signal specifying the position of the polygon mirror. In other words, the sensor generates the polygon mirror reference signal controlling rotation and position of the polygon mirror so that a light corresponding to image data can be projected to the predetermined effective area of the polygon mirror.

The diffraction type optical modulator 450 receives an optical modulator control signal transferred from the driving signal control unit 440, and operates in accordance therewith. Here, an optical modulator control unit may further be operated to control the diffraction type optical modulator 450 by receiving the optical modulator control signal from the driving signal control unit 440. The scanning driver 460 controls a rotation of the polygon mirror by receiving the polygon mirror control signal from the driving signal control unit 440.

Figure 4B:
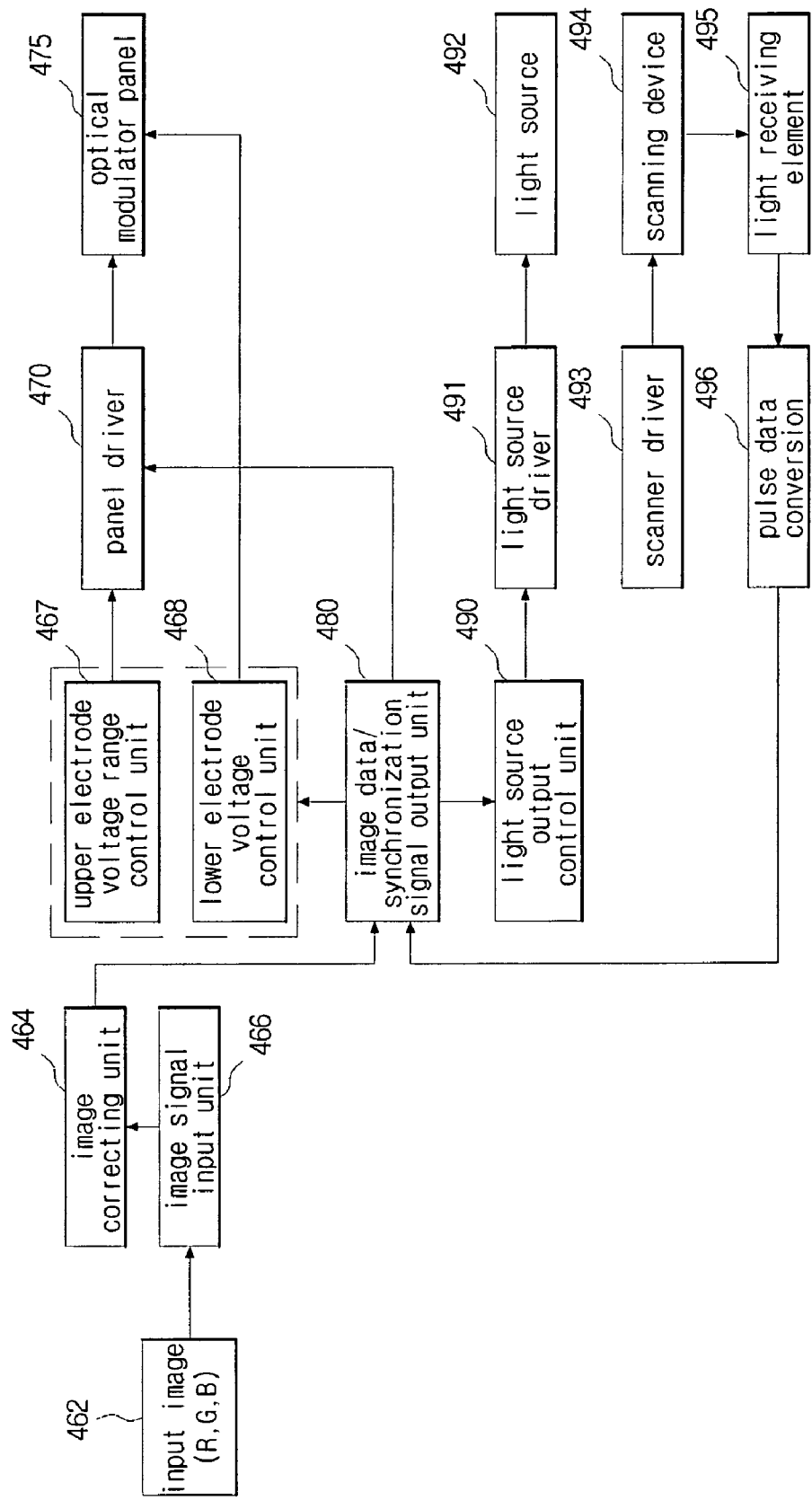
FIG. 4B is a block diagram of a mobile display apparatus control part synchronizing an image signal with a polygon mirror according to an embodiment of the present invention.

The details of constituting components of the mobile display apparatus will be described in the following. FIG. 4B is a block diagram of a mobile display apparatus control part synchronizing an image signal with a polygon mirror according to an embodiment of the present invention.

Referring to FIG. 4B, R, G, and B image signals are inputted to an image signal input unit 466 included in a mobile display apparatus from the mobile display apparatus 462. Here, the image signal input unit 466 transfers the inputted image signal, comprising R, G, and B digital data and a timing signal, to an image correcting unit 464. Then, the image correcting unit 464 corrects the image signals according to a deviation between elements or color characteristics of the image signals.

An image data/synchronization signal output unit 480 makes the image signal pivot from a raster scan direction to a vertical direction, and transfers synchronization signals per frame, pixel synchronization signals, and vertical line output timing signals to a panel driver 470.

The panel driver 470 converts digital image data to an analog signal, and drives an optical modulator panel 475 in synchronization with the vertical line output timing signal. Also, the panel driver 470 matches an image gradient to an output voltage level by referring to an analog voltage range decided in an upper electrode voltage range regulating unit 467.

An optical modulator panel 475 is mechanically deformed by a voltage difference between an upper electrode and a lower electrode (a voltage is applied by a lower electrode voltage control unit 468), and modulates the amount of diffraction of a light emitted from a light source 492.

A light source output control unit 490 outputs and then transfers a light source control signal to a light source driver 491, so that R, G, and B light sources operate sequentially in synchronization with the image synchronization signal received from the image data/synchronization signal output unit 480.

A scanner driver 493 controls a scanning device 494 to operate at a constant speed. A light receiving element (or a sensor) 495 receives a diffracted light reflected from a certain portion of the scanning device 494. Here, such a diffracted light is converted to pulse data, and then inputted to the image data/synchronization signal output unit 480. The image data/synchronization signal output unit 480 can delay an image synchronization signal for a predetermined time based on the inputted pulse data before outputting it. According to an embodiment of the present invention, the image signal can be outputted to a certain point of the scanning device 494 by using the pulse data generated by the light receiving element 495. Here, the scanning device 494 refers to a device that does not have a position control function which is typically performed by a built-in feedback device like an optical encoder (for example, the aforementioned scanner output control unit), and may be a polygon mirror, a rotating bar or the like.

Figure 5A:
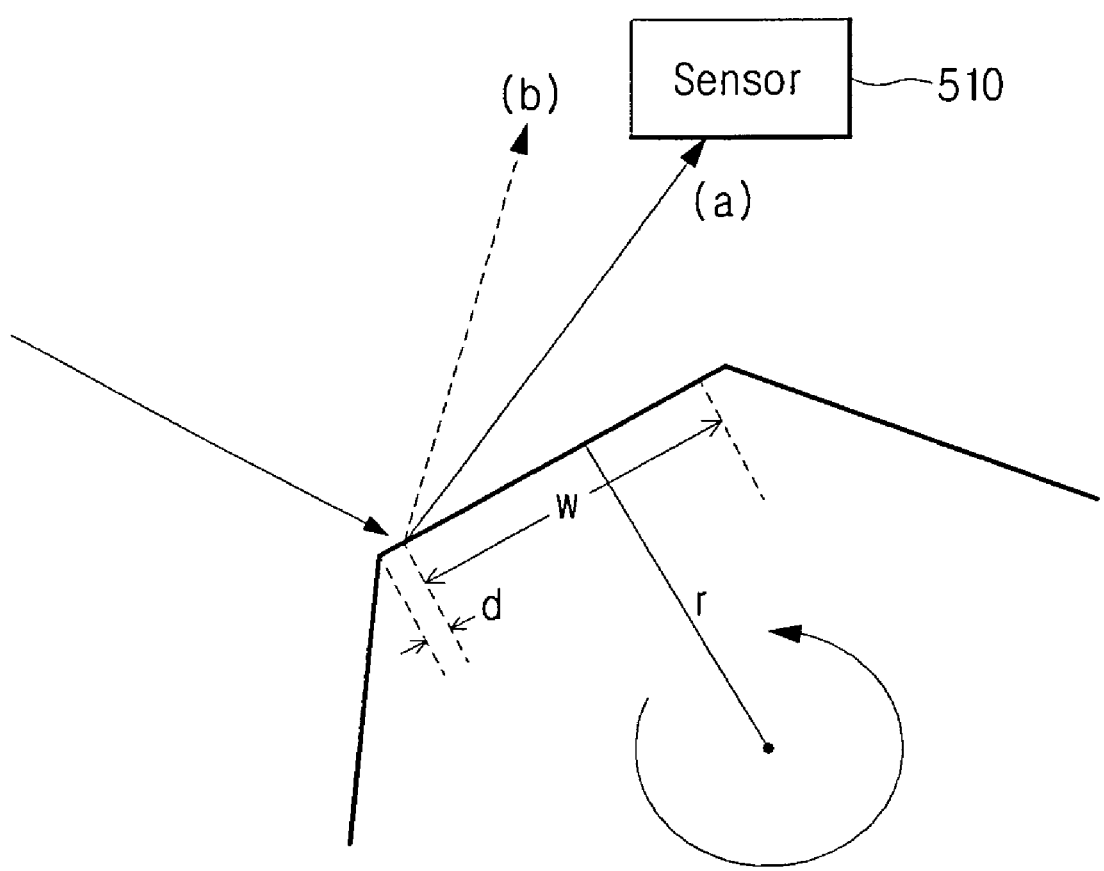
FIG. 5A is a schematic view showing generating a polygon mirror reference signal using a sensor according to an embodiment of the present invention.

FIG. 5A is a schematic view showing generating a polygon mirror reference signal using a sensor according to an embodiment of the present invention. In FIG. 5A are illustrated a polygon mirror 330, a sensor 510, a path a of a light generating the polygon mirror reference signal and a path b of a light corresponding to an image signal.

The sensor 510 may be disposed on a first side of the screen 340, or on any location where a polygon mirror reference laser can be perceived. Here, the polygon mirror reference laser refers to a laser reflected from a side of the polygon mirror 330 to generate a signal for monitoring the position of the polygon mirror. Such a polygon mirror reference laser may be projected from the diffraction type optical modulator 450. Since the lights reflected from both pointed ends of the polygon mirror 330 may distort the image when projected on the screen, an effective area (the width of the effective area is w) is specified on each side of the polygon mirror 330. The distance between the polygon mirror 330 and a center portion of the screen 340 is different from the distance between the polygon mirror 330 and a side portion, resulting in a distortion of a picture. Accordingly, to limit the distortion within a tolerable range is specified the effective area on the polygon mirror 330.

Consequently, the polygon mirror reference laser may be reflected outside the effective area, and the sensor 510 generates a polygon mirror reference signal by sensing such a polygon mirror reference laser. In this case, an image synchronization signal is delayed for a predetermined time to be synchronized with the polygon mirror reference signal, so that image data is projected on the screen 340 through the effective area. Here, the predetermined time may be a time difference between the moment the polygon mirror reference laser is reflected outside the effective area and the moment a laser corresponding to the image synchronization signal is first reflected from the effective area.

Figure 5B:
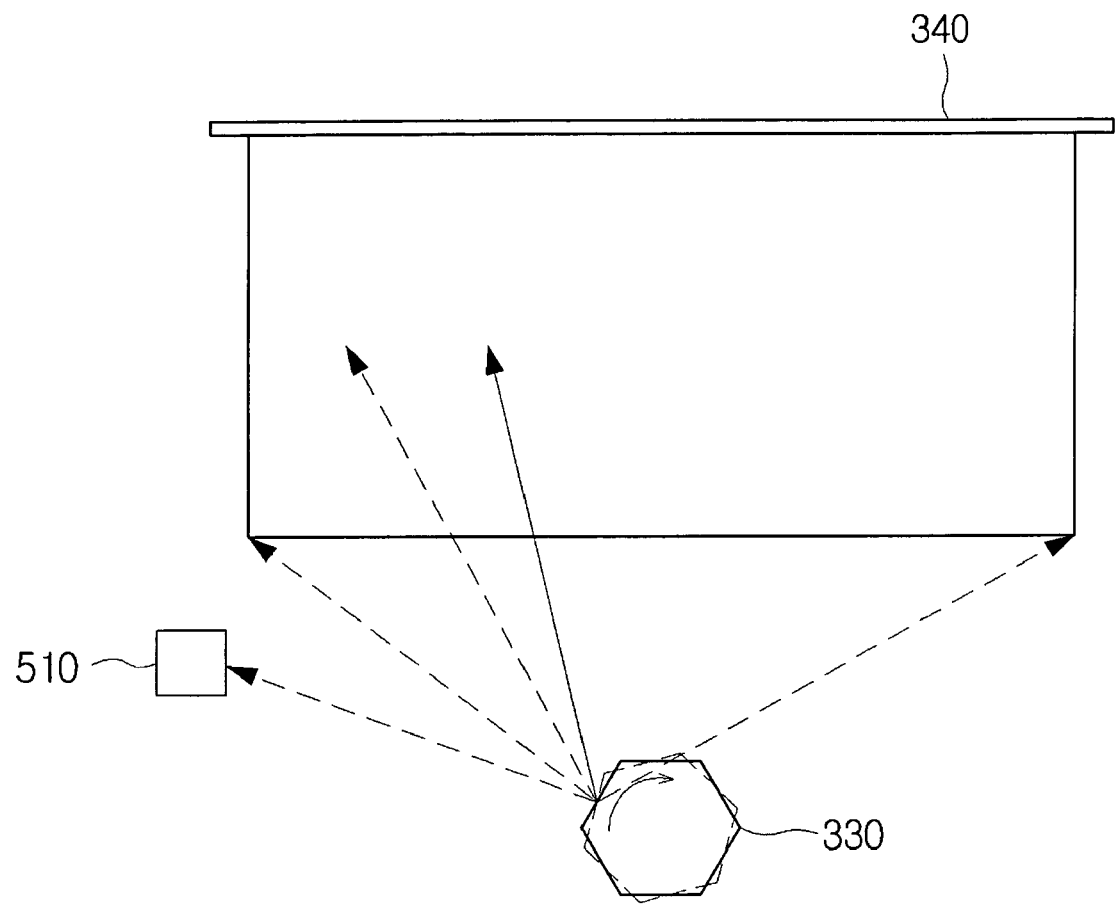
FIG. 5B illustrates a sensor placed in a certain location according to an embodiment of the present invention.

In FIG. 5B, a sensor 510 is placed in a certain location. The sensor 510 receives a diffracted light before image data is outputted to a screen 340. Since a light corresponding to an image signal is outputted to the screen regardless of the sensor 510, the sensor 510 does not interrupt the path of the light.

Figure 6A:
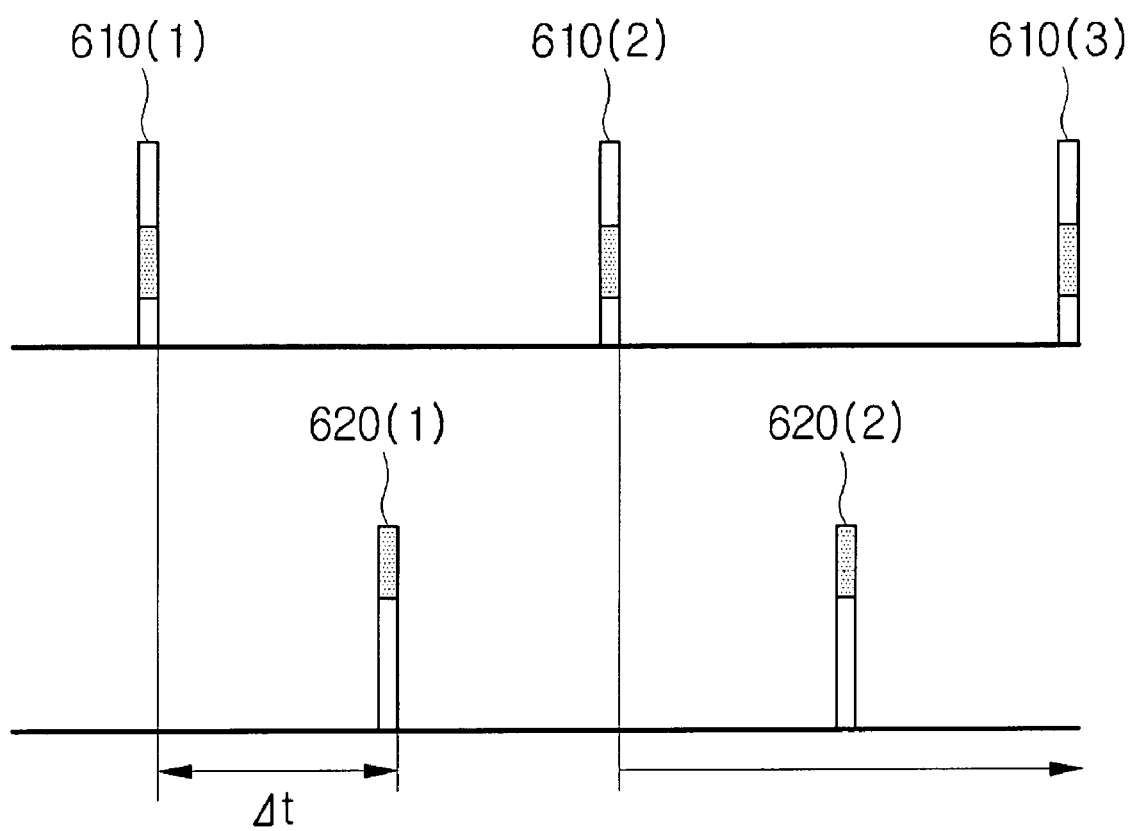
FIGS. 6A and 6B illustrate a synchronized state of image synchronization signals with polygon mirror reference signals, which are delayed for a predetermined time according to an embodiment of the present invention.
Figure 6B:
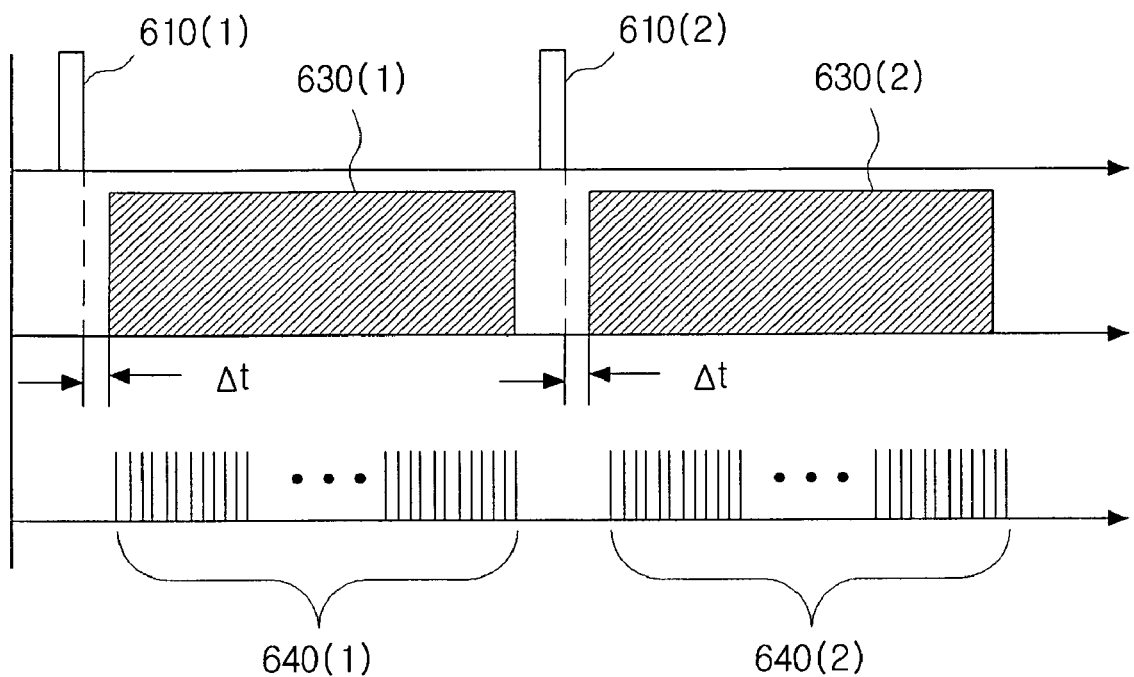

The predetermined delay time is described in detail with FIGS. 6A and 6B. In FIG. 6A are illustrated image synchronization signals delayed for a predetermined time to be synchronized with the polygon mirror reference signals. Image synchronization signals 620(1) and 620(2) are each delayed for the predetermined time Δt to be synchronized with polygon mirror reference signals 610(1), 610(2) and 610(3). Such a predetermined time is decided based on the width of the side of the polygon mirror and an angular speed of the polygon mirror. Since the delay time Δt is a time required for the polygon mirror to rotate a distance from an edge of the polygon mirror to the effective area of the polygon mirror, the wider the side of the polygon mirror becomes, the longer the delay time Δt takes in correspondence therewith. However, the faster the angular speed is, the shorter the delay time Δt takes. The delay time Δt may be expressed as a time difference between the moment the polygon mirror reference signal is generated outside the effective area and the moment a light is incident on a starting point of the effective area.

The delay time Δt is approximately decided by the following equation.

$$xt = \frac{d}{r\Omega} \quad (1)$$

$$\Omega = \frac{2\pi}{T} \quad (2)$$

Here, Δt is the delay time, r is a rotation radius of the polygon mirror, d is a distance from a point of the polygon mirror, to which a light corresponding to the polygon mirror reference signal is reflected, to a starting point of the effective area, T is a rotation period of the polygon mirror, and Ω is an angular speed of the polygon mirror.

In relation to image data, the image data 630(1) and 630(2) are outputted Δt time later after polygon mirror reference signals 610(1) and 610(2) are outputted, as shown in FIG. 6B. The image data 630(1) and 630(2) are outputted as many as the number of predetermined pixels 640(1) and 640(2).

Figure 7:
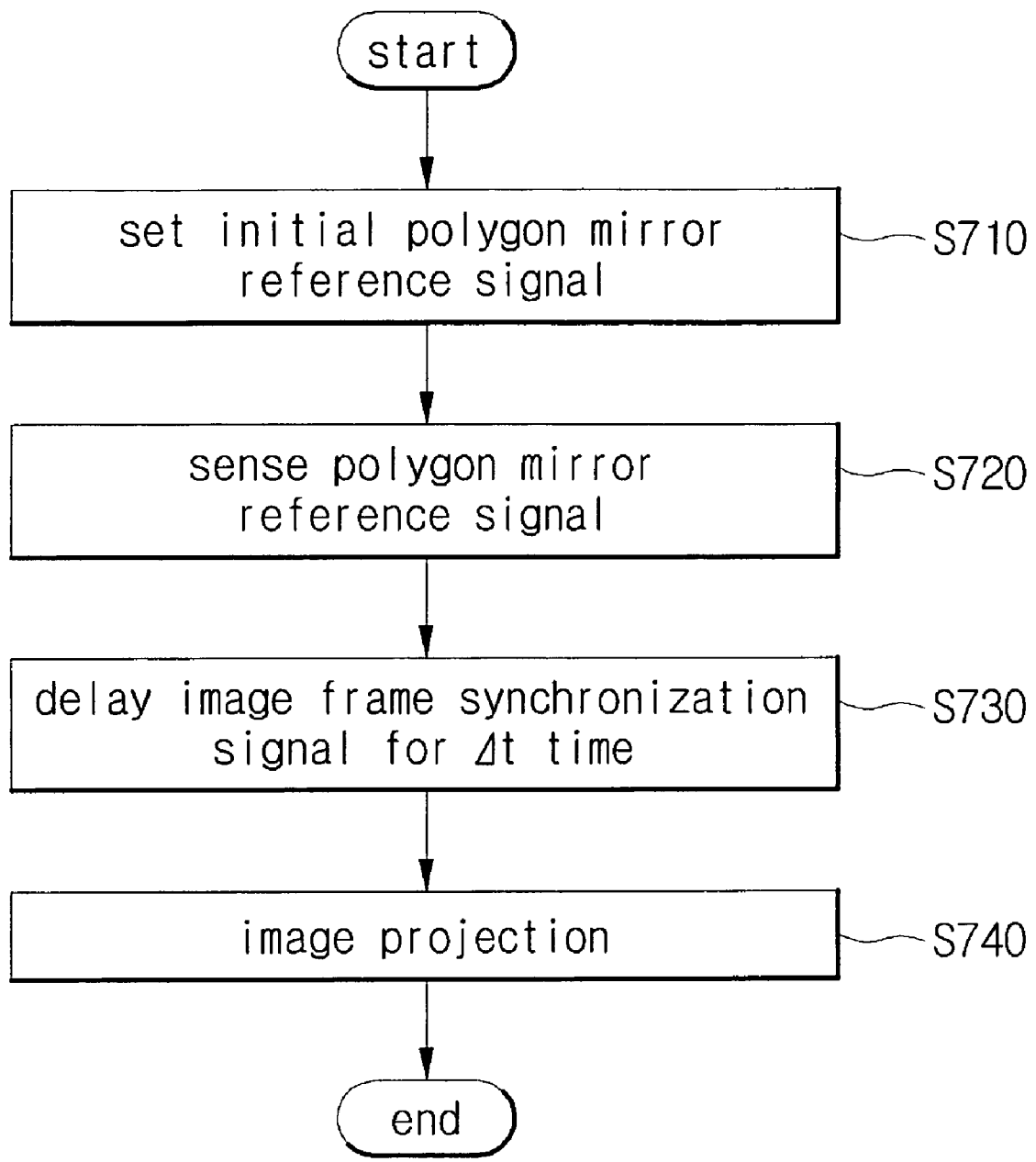
FIG. 7 is a flow chart showing a display method using an optical modulator and a polygon mirror according to an embodiment of the present invention.

FIG. 7 is a flow chart showing a display method using an optical modulator and a polygon mirror according to an embodiment of the present invention.

An initial polygon mirror reference signal is set at step 710. As a default value, the set polygon mirror reference signal is modified by a polygon mirror reference signal sensed later. Afterward, an image input unit receives an image signal from a mobile terminal.

At step S720, an image data processing unit converts the format of the image signal to a format adequate to the optical modulator, and a sensor senses a light reflected from a side of a polygon mirror to generate a polygon mirror reference signal specifying the position of the polygon mirror.

At step S730, the driving signal control unit generates such polygon mirror control signal and optical modulator control signal that allow a light emitted from an optical modulator to be reflected in a predetermined area of the polygon mirror, by synchronizing the polygon mirror reference signal transferred from the sensor with an image synchronization signal by delaying the image synchronization signal for a predetermined time.

At step S740 is projected an image by controlling the polygon mirror with the polygon mirror control signal, and controlling the optical modulator with the optical modulator control signal.

While the invention has been described with reference to the disclosed embodiments, it is to be appreciated that those skilled in the art can change or modify the embodiments without departing from the scope and spirit of the invention or its equivalents as stated below in the claims.

The embodiments of the invention in which an exclusive property or privilege is claimed are defined as follows:

1. A mobile display apparatus using an optical modulator, comprising:
   a sensor sensing light reflected from a scanning device and then generating a scanning device reference signal specifying a position of the scanning device; and
   a driving signal control unit generating a scanning device control signal and an optical modulator control signal that allow light emitted from an optical modulator to be reflected in a predetermined area of the scanning device, by synchronizing the scanning device reference signal transferred from the sensor with an image synchronization signal.

2. The mobile display apparatus of claim 1, wherein the image synchronization signal is delayed for a predetermined time to be synchronized with the scanning device reference signal.

3. The mobile display apparatus of claim 1 further comprises a scanning driver controlling rotation of the scanning device based on a scanning device reference signal or a scanning device control signal from a driving signal control unit.

4. The mobile display apparatus of claim 1 further comprises an optical modulator control unit controlling the optical modulator by receiving the optical modulator control signal from the driving signal control unit.

5. The mobile display apparatus of claim 1, wherein the scanning device is selected from the group consisting of a polygon mirror and a rotating bar.

6. The mobile display apparatus of claim 1, wherein the sensor sensing light reflected from the side of the scanning device.

7. A mobile display apparatus using an optical modulator, comprising:
   an image input unit receiving an image signal from a mobile terminal;
   an image data processing unit converting the format of the image signal to a format adequate to the optical modulator-wherein the image signal comprises an image synchronization signal and image data;
   a sensor sensing a light reflected from a scanning device and then generating a scanning device reference signal specifying the position of the scanning device; and
   a driving signal control unit generating such scanning device control signal and optical modulator control signal that allow a light emitted from the optical modulator to be reflected in a predetermined area of the scanning device by synchronizing the scanning device reference signal transferred from the sensor with an image synchronization signal converted in the image data processing unit.

8. The mobile display apparatus of claim 7, wherein the image synchronization signal is delayed for a predetermined time to be synchronized with the scanning device reference signal.

9. The mobile display apparatus of claim 7 further comprises a scanning driver controlling a rotation of the scanning device by receiving the scanning device reference signal or the scanning device control signal from the driving signal control unit.

10. The mobile display apparatus of claim 7 further comprises an optical modulator control unit controlling the optical modulator by receiving the optical modulator control signal from the driving signal control unit.

11. The mobile display apparatus of claim 7, wherein the scanning device is selected from the group consisting of a polygon mirror and a rotating bar.

12. The mobile display apparatus of claim 7, wherein the sensor sensing light reflected from the side of the scanning device.

13. A display method using an optical modulator comprising:
   transferring an image signal from a mobile terminal to an image input unit;
   converting a format of the image signal to a format adequate to an optical modulator, by an image data processing unit;
   sensing a light reflected from a scanning device and then generating a scanning device reference signal specifying a position of the scanning device, by a sensor: and
   generating such scanning device control signal and optical modulator control signal that allow a light emitted from the optical modulator to be reflected in a predetermined area of the scanning device, by synchronizing the scanning device reference signal transferred from the sensor with an image synchronization signal converted in the image data processing unit, by a driving signal control unit.

14. The display method of claim 13, wherein the image synchronization signal is delayed for a predetermined time to be synchronized with the scanning device reference signal.

15. The display method of claim 13 further comprises controlling a rotation of the scanning device by receiving the scanning device reference signal or the scanning device control signal from the driving signal control unit, by a scanning driver.

16. The display method of claim 13 further comprises controlling the optical modulator by receiving the optical modulator control signal from the driving signal control unit, by an optical modulator control unit.

17. The display method of claim 13, wherein the scanning device is selected from the group consisting of a polygon mirror and a rotating bar.

18. The display method of claim 17, wherein the reflected light is sensed from a side of the scanning device.

* * * * *